United States Patent [19]
Bodmer et al.

[11] Patent Number: 5,726,829
[45] Date of Patent: Mar. 10, 1998

[54] AXIAL SPINDLE MOTOR FOR HARD DISK DRIVE ASSEMBLY

[75] Inventors: James H. Bodmer, Longmont; Mark A. Diel, Boulder; Forrest D. Titcomb, Colorado Springs, all of Colo.

[73] Assignee: Maxtor Corporation, Longmont, Colo.

[21] Appl. No.: 746,723

[22] Filed: Nov. 15, 1996

Related U.S. Application Data

[63] Continuation of Ser. No. 369,934, Jan. 9, 1995, abandoned, which is a continuation of Ser. No. 163,359, Dec. 3, 1993, abandoned.

[51] Int. Cl.$^6$ ................................................. G11B 17/02
[52] U.S. Cl. ................................................. 360/99.08
[58] Field of Search .......................... 360/99.08, 97.01, 360/97.02, 99.07; 310/180, 193, 254, 261

[56] References Cited

U.S. PATENT DOCUMENTS

| | | | |
|---|---|---|---|
| 4,814,652 | 3/1989 | Wright | 360/98.07 |
| 4,858,044 | 8/1989 | Crapo | 360/99.08 |
| 5,057,731 | 10/1991 | Hancock | 310/180 |
| 5,160,865 | 11/1992 | Gururangan | 360/98.07 |
| 5,195,002 | 3/1993 | Sakurai | 360/99.08 |
| 5,396,139 | 3/1995 | Surmely et al. | 310/254 |

FOREIGN PATENT DOCUMENTS

| | | | |
|---|---|---|---|
| 521437A | 1/1993 | European Pat. Off. | 360/99.08 |
| 4241260 | 8/1992 | Japan | 360/99.08 |

*Primary Examiner*—Allen Cao
*Attorney, Agent, or Firm*—Sheridan Ross P.C.

[57] ABSTRACT

An in-spindle axial-field motor assembly for a disk storage system includes a stationary baseplate and a cover plate secured to the base to form a housing. Disposed about the cover are cylindrical coils which form a motor stator. The motor assembly includes a rotor having inner and outer hubs disposed within the housing. The inner hub is rotatably mounted and supported by a bearing assembly. The outer hub supports an annular, rigid disk which provides a recording medium for storage of information. An axially-magnetized magnet is disposed between the inner and outer hub with the rotor being positioned between the cover and baseplate such that the net axial force acting on the rotor is minimized during motor operation. Ferromagnetic poles are positioned in the center of each coil to enhance the motor's torque generation capability while implementing an axially force-balanced design.

32 Claims, 3 Drawing Sheets

1

AXIAL SPINDLE MOTOR FOR HARD DISK DRIVE ASSEMBLY

This is a continuation of application Ser. No. 08/369,934, filed on Jan. 9, 1995 which is a continuation of application Ser. No. 08/163,359, filed on Dec. 3, 1993, now abandoned.

FIELD OF THE INVENTION

This invention relates to the field of axial motor assemblies of the type which provide rotation for a spindle element. More specifically, the present invention relates to axial motor assemblies which are utilized in a computer disk drive recording system.

BACKGROUND OF THE INVENTION

Hard disk drive memory systems have been used in the field of magnetic recording for storage of digital information for many years. The digital information is recorded on concentric memory tracks of a magnetic disk medium. The disks themselves are rotatably mounted on a spindle, and information is accessed by means of read/write heads generally located on pivoting arms which move radially over the surface of the disk. During operation, the disks are rotated at very high speeds by means of an electric motor. The motor is generally located inside the hub or below the spindle.

The trend in the disk drive industry has been to decrease the physical size of hard disk drive assemblies while maintaining or increasing the data storage capacity of the units. To achieve this goal, practitioners must design efficient motors with sufficient torque to overcome head stiction and bearing friction forces present during start-up.

The amount of torque generated by an electric motor is dependent on a number of factors including flux density, coil size, and the number of coil windings. Among other factors, the flux density is dependent on the magnet thickness, air gap thickness, and electrical power input. Subsequently, for a given power input, the torque generating capability of an electric motor is very much dependent on the physical characteristics of the motor components.

As previously discussed, spindle motors are generally located either inside the hub or below the spindle of the drive assembly. As the size of disk drive units have become increasingly smaller, it has become less common to place the disk drive motor below the spindle because of the space volume required to accommodate this type of motor/spindle arrangement. Consequently, a type of motor known as an "in-hub" or "in-spindle" motor is most commonly used. In this type of motor assembly the drive motor is incorporated within the spindle itself. Typically, the stator of the in-spindle motor is attached to a stationary, cylindrical spindle shaft. An electromagnetic coil is then disposed about the longitudinal axis of the shaft. Both the stator and shaft are housed within a rotatable hub. Within the spindle, a magnetic means is attached and disposed radially about the stator for interacting electromagnetically with the coil to cause rotation of the hub relative to the shaft during operation. Although the in-spindle motor described above is well-suited for conventional hard disk drive assemblies, the motor's radial configuration is limiting in that it fails to maximize the space available to accommodate the motor components. Consequently, it is difficult to design a radial field motor that will meet the power and torque requirements needed for small form factor disk drive assemblies. For example, in small form-factor drive assemblies having a nominal disk outside diameter of less than 1.3 inches, less than 0.10 inches is generally available to accommodate the motor's magnet, coil and air gap in the radial direction. This space limitation makes it nearly impossible to produce a radial motor that is capable of generating the required starting torque without significantly increasing the motor electrical input power. Increasing the motor's electrical input power, however, introduces a number problems. A higher power input produces more heat within the drive assembly which adversely affects motor life. A number of design problems also arise associated with ensuring that a proper heat balance is maintained within the drive unit to prevent thermal distortions and dislocation. Furthermore, increasing the input power shortens the operating period of battery-powered computers.

Axial field motors have been utilized in a limited number of hard disk drive applications. Their use, however, has been limited to arrangements whereby the motor is disposed below the spindle of the drive assembly. As previously discussed, this type of motor/spindle arrangement requires more space and limits the number of disks that can be arranged in the drive assembly. Although several in-spindle axial motor prototypes have been built and tested, no existing design has met the torque and power requirements required for use in small form-factor hard disk drive assemblies.

What is needed then is a spindle motor that will meet the size, power and torque requirements of small form-factor hard disk drive assemblies. As will be seen, the present invention provides an axial in-spindle motor that is capable of producing more torque, for a given power input, than prior art designs. As a result, the present invention is capable of producing the torque required to overcome the head stiction and bearing friction forces at start-up while meeting the size and power requirements of small form-factor hard disk drive assemblies.

SUMMARY OF THE INVENTION

An in-spindle axial-field motor assembly for a disk storage system is disclosed. In one embodiment, the present invention comprises a stationary baseplate, and a cover secured to the baseplate to form a housing. Disposed about the cover are cylindrical coils which form the motor stator. The rotor includes inner and outer hubs that are disposed within the housing. The inner hub is rotatably mounted and supported by means of a bearing assembly. The outer hub supports an annular, rigid disk which provides a recording medium for storage of information. An axially-magnetized magnet is disposed between the inner and outer hub for interacting electromagnetically with the coils to cause rotation of the rotor relative to the cover and baseplate during operation. The rotor is positioned between the cover and baseplate such that the net axial force acting on the rotor is minimized during motor operation. Ferromagnetic poles positioned in the center of each motor coil enhance the motor's torque generation capability. Thus, the invention provides an in-spindle axial-field motor that is ideally-suited for use in small form factor information storage units.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

An in-spindle axial-field motor assembly for a disk storage system is disclosed. In the following description, numerous specific details are set forth such as dimensions, material types, spacings, etc., in order to provide a thorough understanding of the present invention. However, it will be obvious to one skilled in the art that the invention may be practiced without these specific details. In other instances, well-known elements and processing techniques have not been shown in particular detail in order to avoid unnecessarily obscuring the present invention.

As discussed above, the trend in the disk drive industry has been to decrease the physical size of hard disk drive assemblies while maintaining or increasing the data storage capacity of the units. Because small form-factor drives have a very limited space to house the assembly's spindle motor components, the further down-scaling of such drive assemblies has been limited by the ability of practitioners to provide a spindle motor that is capable of producing enough torque to overcome head stiction and bearing friction forces that exists during start-up. To achieve the torque required to overcome the stiction and friction forces present in small form-factor drive assemblies, the present invention provides an axial-field, axially-force balanced spindle motor that produces more torque per unit power input than conventional motors.

Figure 1:
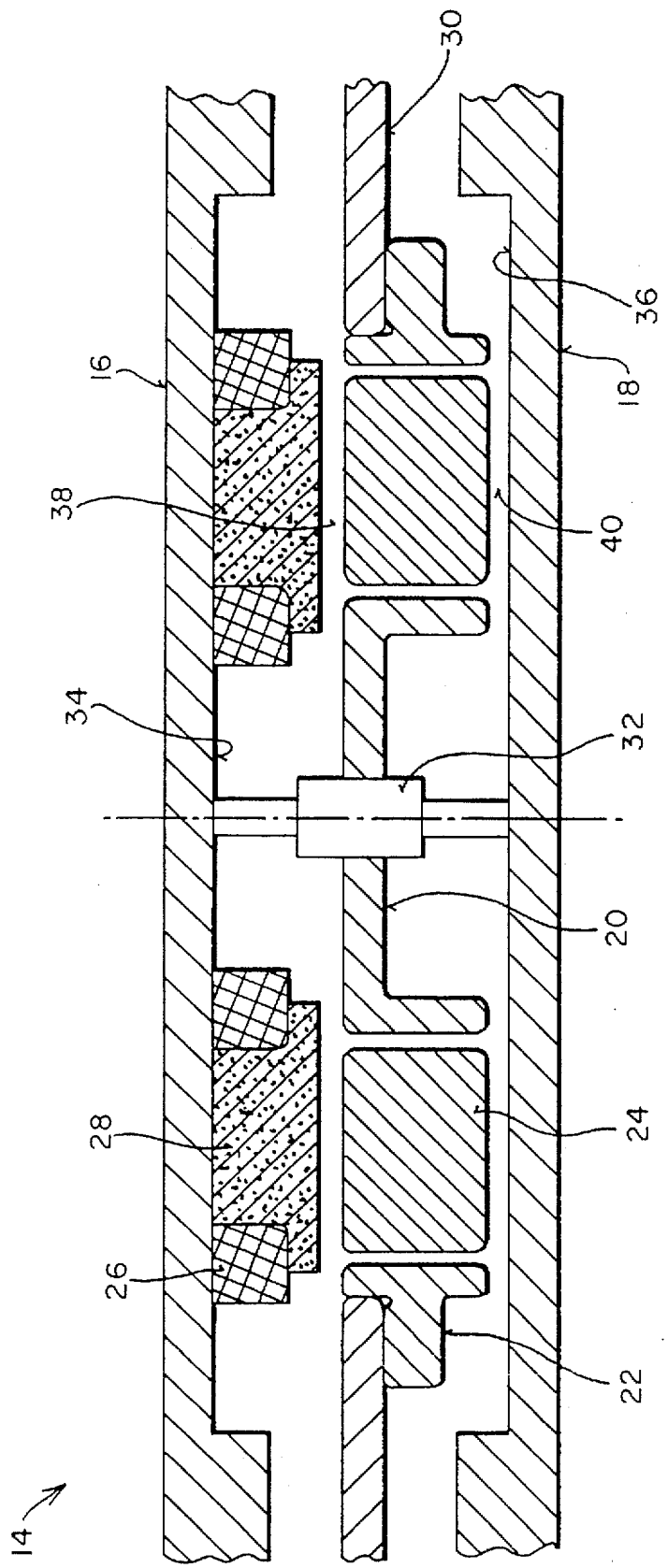
FIG. 1 illustrates the hard disk drive assembly of one embodiment of the present invention.

FIG. 1 illustrates a cross-sectional side view of an information storage unit 14 incorporating the axial-field, axially force-balanced spindle motor assembly of the present invention. Information storage unit 14 includes a cover plate 16, which is securely attached to a baseplate 18 by means of screws disposed about the peripheral areas of the plates. Both the cover plate 16 and baseplate 18 preferably comprise a ferromagnetic metal or metal alloy such as carbon steel which assists in forming the magnetic return path for the spindle motor magnet. It should be noted that the magnetic return path may be formed using an alternative means, thereby eliminating the need for a ferromagnetic cover and baseplate. When assembled, the two plates 16 and 18 form a central cavity therebetween.

Within the cavity formed by plates 16 and 18 resides a rotor assembly, stator assembly, actuator arm assembly (not shown) and bearing assembly. The rotor assembly comprises an inner hub 20, outer hub 22, magnet 24, and rigid magnetic disk 30. Inner hub 20 is rotatably mounted and supported by means of a bearing assembly 32 located at the axial center of the inner hub. Bearing assembly 32 preferably comprises a fluid-bearing but may include a ball-bearing, air-bearing, or any other bearing which meets the space constraints of the unit. Outer hub 22 supports an annular rigid-disk 30 about its peripheral surface. Rigid disk 30 may be secured to outer hub 22 by means of a clamp or an adhesive such as epoxy glue. Most often, rigid-disk 30 comprises an aluminum or an aluminum alloy substrate over which has been formed a magnetic layer. Magnet 24 is disposed between inner and outer hub, 20 and 22, and may comprise a plurality of axially-magnetized permanent magnetic segments or a single permanent magnet. In a preferred embodiment, magnet 24 includes eight axially magnetized poles spaced equidistant about the magnet's circumference. The adjacent poles of the magnet have opposite north and south magnetic poles. Permanent magnet 24 preferably comprises Neodymium, whereas inner and outer hub, 20 and 22, comprise a non-ferromagnetic material, such as AISI 300 stainless steel. Basically, any non-ferromagnetic material having thermal properties similar to magnet 24 may be used for hubs 20 and 22. Magnet 24 is secured to inner and outer hubs 20 and 22 by means of an adhesive, such as an epoxy glue. Air gaps, 38 and 40, are provided above and below magnet 24 such that the net axial force acting on the rotor assembly is minimized during motor operation.

Figure 2:
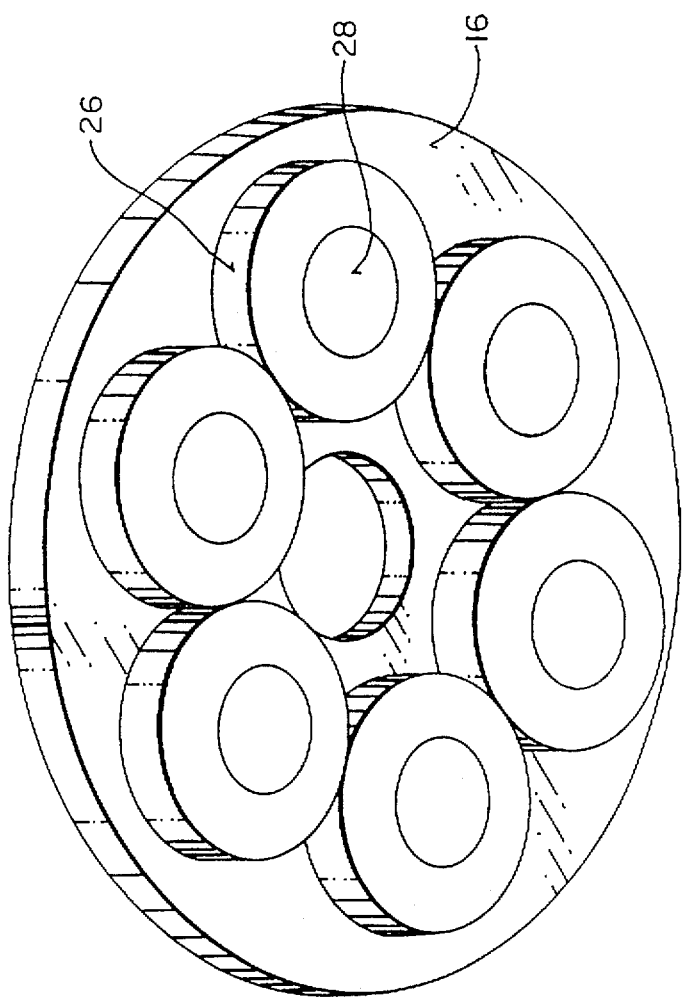
FIG. 2 illustrates the stator coil arrangement of the hard disk drive assembly shown in FIG. 1.

Attached to the inner surface 34 of cover plate 16 are a set of cylindrical coils 26 which form the motor's stator assembly. A preferred embodiment of the present invention includes a set of six coil windings 26 as shown in FIG. 2. Coils 26 are centrally located above magnet 24 and are disposed in a circular pattern equidistant about inner surface 34. Each coil has a cylindrical ferromagnetic pole 28 disposed at its center. It should be understood that poles 28 may be manufactured integrally as a part of cover plate 16 or separately and then attached to cover plate 16. It is also appreciated that the dimensional characteristics and geometric shape of members 26 and 28 are in no way intended to be limiting.

Stator coils 26 comprise copper wire windings, and may be formed by wrapping the copper wire onto steel poles 28 or by other methods as known in the electric motor art. In the current embodiment coils 26 are attached to cover plate 16 by means of an adhesive, such as an epoxy glue. A flex lead (not shown) provides electrical connection between coils 26 and an ordinary power supply.

Though the spindle motor has been described as an 8-pole, 3-phase, 6-winding motor, other motor arrangements may be used. For example, another possible configuration is a 4-pole, 3-phase, 3-winding, or 12-pole, 3-phase, 9-winding configuration.

The key aspect of the present invention lies in the use of an axial-field, axially-force balanced spindle motor having stator coils, each possessing a ferromagnetic pole at its center. As previously discussed, the amount of torque generated by an electric motor is dependent on a number of factors, including flux density, coil size, and the number of coil windings. Among other factors, the flux density is dependent on magnet thickness, air gap thickness, and electrical power input. Because the present invention includes a motor having an axial configuration, more space is afforded to the motors magnet, air gaps, and coils than in prior art motor configurations. The reason for this is that in a standard disk drive the radial dimension is partially occupied by the motor's bearing assembly, resulting in less space to house the other components. Consequently, larger magnet and coil components may be used within an axially-configured motor, thereby increasing the available torque output.

To further enhance the torque generating capability of the spindle drive motor, the present invention incorporates ferromagnetic poles 28 in the center of stator coil windings 26. Poles 28 effectively decrease the air gap length between the motor magnet and coils, thereby increasing the flux density in the coil region. As a result, the motor is capable of generating up to twice as much torque for a given power input as compared to conventional designs.

Another feature of the present invention is the use of air gaps, 38 and 40, located above and below magnet 24, respectively. Because cover plate 16 and baseplate 18 preferably comprise a ferromagnetic material, a magnetic flow path is established on both sides of magnet 24. Air gaps 38 and 40 are spaced such that the net axial force acting on the rotor assembly is zero when the motor is energized. This minimizes bearing friction forces within the assembly so as to lower the amount of motor torque needed at start-up.

Figure 3:
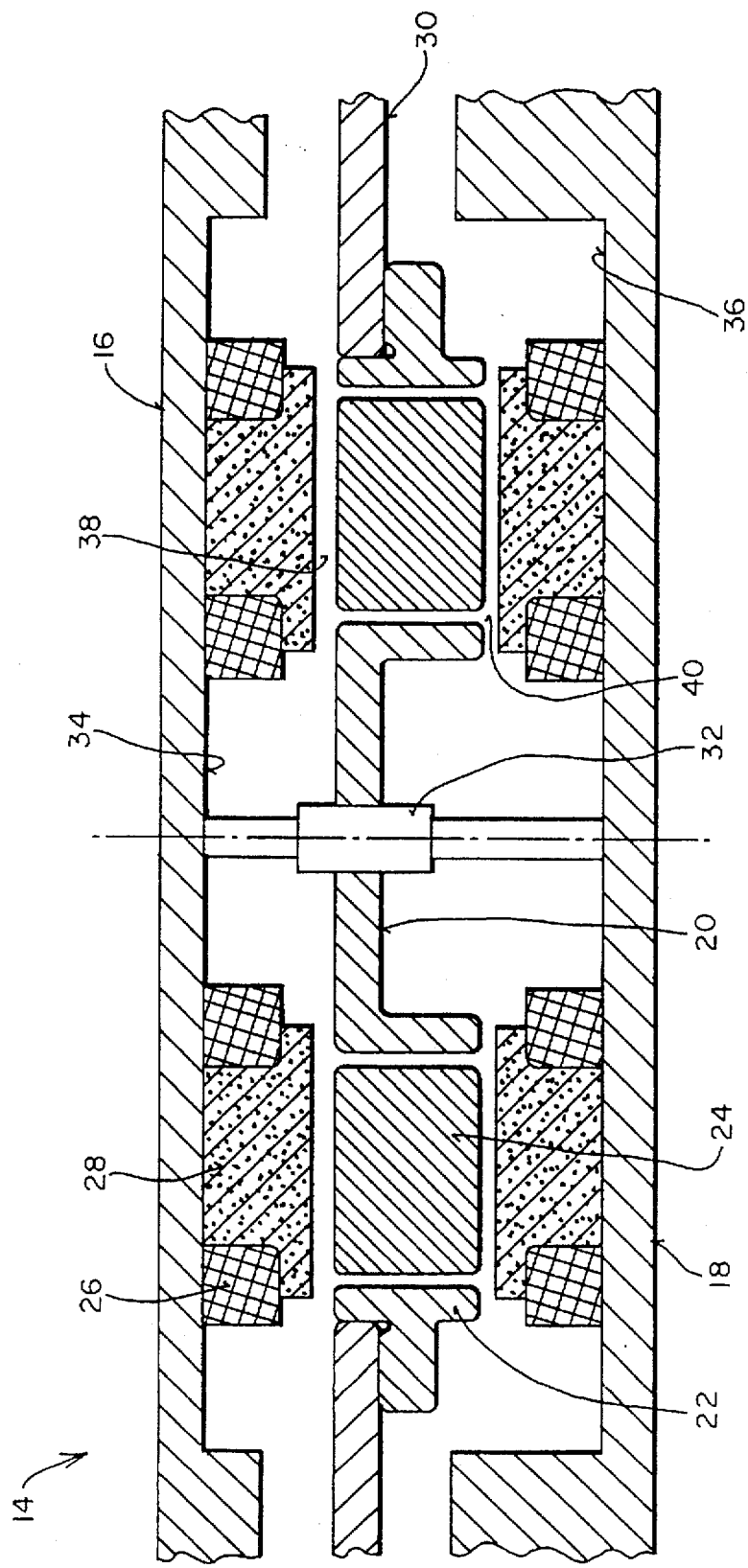
FIG. 3 illustrates the hard disk drive assembly of another embodiment of the present invention.

FIG. 3 illustrates a cross-sectional side view of another embodiment of the present invention. The embodiment of FIG. 3 includes the same basic elements of the embodiment of FIG. 1, except that coil windings 26 are provided on both cover plate and baseplate inner surfaces, 34 and 36 to form the spindle motor stator assembly. The embodiment of FIG. 3 may be embodied in a number of motor arrangements including; 4-pole, 3-phase, 6-winding; 8-pole, 3-phase, 12-winding; and 12-pole, 3-phase, 18-winding configurations. In all motor configurations, cover plate 16 and baseplate 18 should have an equal number of coil windings 26 for proper operation. For example, in a motor configuration having a total of twelve coil windings, cover plate 16 and baseplate 18 would each have six coil windings 26 attached to their respective surfaces.

Similar to the embodiment of FIG. 1, the embodiment of FIG. 3 includes air gaps, 38 and 40, disposed above and below magnet 24. The rotor is positioned such that air gaps 38 and 40 are equally-spaced. As a result, the net axial force acting on the rotor assembly is minimized during motor operation.

Whereas many alternations and modifications to the present invention will no doubt become apparent to the person of ordinary skill in the art after having read the foregoing description, it is to be understood that the particular embodiments shown and described by way of illustration are in no way intended to be limiting. Therefore, reference to the details of the illustrated diagrams is not intended to limit the scope of the claims which themselves recite only those features regarded as essential to the invention.

We claim:

1. A spindle motor assembly of a disk drive comprising:
   a support structure including a first support plate, a second support plate substantially opposite said first support plate, and a spindle surface;
   a rotor, located between said first and second support plates, and capable of rotating about a primary axis, said rotor including an inner hub and an outer hub, said outer hub radially spaced from said inner hub and operatively coupled to said inner hub to rotate therewith;
   a bearing assembly, located between said spindle surface and said rotor, for facilitating rotational movement of said rotor about said primary axis;
   magnet means having a first side and a second side opposite said first side, said magnet means being attached to said rotor and providing a magnetic field, said magnet means positioned radially between said inner hub and said outer hub;
   a stator disposed between said first and second support plates and operatively attached to said first support plate, said stator capable of interacting electromagnetically with said magnet means to rotate said rotor relative to said stator, said stator including two or more coils, each of said coils wound about a second axis that is substantially parallel to said primary axis of said rotor, a first air gap being formed immediately adjacent the first side of the magnet between said magnet and said coils and a second air gap being formed immediately adjacent the second side of the magnet between said magnet and said second support plate;
   wherein said bearing assembly has a first radius with respect to said primary axis;
   wherein said magnet means is disposed over a second radius range extending from said primary axis that is different from said first radius range.

2. The assembly of claim 1 wherein said magnet means is axially aligned with said stator.

3. The assembly of claim 1 wherein said first air gap and said second air gap are spaced such that the sum of the axial magnetic forces acting on said rotor is substantially zero during drive motor operation such that the bearing friction forces within the assembly are minimized and the amount of motor torque needed at start-up is lowered, said axial magnetic forces being parallel to said primary axis.

4. A spindle motor assembly of a disk drive, as claimed in claim 1, wherein said magnet means is positioned within an annular region defined between a second radius and a third radius wherein said second and third radii are each greater than said first radius.

5. A rigid disk drive comprising:
   a base;
   a cover secured with respect to said base to create a space therebetween;
   a spindle surface disposed within said space;
   an inner hub that is capable of rotating about primary axis and defining an inner hub radius, with respect no said primary axis;
   an outer hub, operatively coupled to said inner hub to rotate therewith, said inner and outer hubs being disposed within said space and defining a first region extending radially outward from said inner hub radius;
   an annular rigid disk, operatively attached to said outer hub, for storing data;
   a bearing assembly, located between said spindle surface and said inner hub, for facilitating rotational movement of said inner hub, said outer hub and said disk about said primary axis;
   a magnet assembly having at least one magnet, said magnet assembly, disposed radially between said inner and outer hubs in said first region, the magnet assembly having a first side and a second side opposite the first side;
   a stator operatively attached to said cover and capable of interacting electromagnetically with said magnet assembly to rotate said inner hub, said outer hub, and said disk relative to said stator, said stator including two or more coils, each of said coils being wound around a second axis that is substantially parallel to said primary axis of said inner hub;
   a first air gap formed immediately adjacent the first side of the magnet assembly between said magnet assembly and said coils; and
   a second air gap formed immediately adjacent the second side of the magnet assembly between said magnet assembly and said base.

6. The drive of claim 5 wherein said base and said cover comprise a ferromagnetic material.

7. The drive of claim 5 wherein said base and said cover comprise carbon steel.

8. The drive of claim 5 wherein said magnet assembly comprises a plurality of magnetic segments.

9. The drive of claim 5 wherein said magnet assembly is annular.

10. The drive of claim 5 wherein said magnet assembly comprises Neodymium.

11. The drive of claim 5 wherein said inner hub add said outer hub both comprise a non-ferromagnetic material.

12. The drive of claim 11 wherein said non-ferromagnetic material is thermally matched to said magnet assembly.

13. The drive of claim 5 wherein said inner hub and said outer hub comprise steel.

14. The drive of claim 5 wherein said magnet assembly is axially aligned with said stator.

15. The drive of claim 5 wherein said first air gap and said second air gap are spaced such that total axial magnetic forces acting on said inner hub is substantially zero during drive motor operation that bearing friction forces within the bearing assembly are lowered and the amount of motor torque needed at start-up is lowered, said axial magnetic forces being parallel to said primary axis.

16. The drive of claim 5 wherein said bearing assembly is disposed over a first radius range, said first radius range being the range from said primary axis to a first bearing radius and wherein said magnet means is disposed over a second radius range with respect to said primary axis, said second radius range being the range from an inner magnet means radius to an outer magnet means radius, wherein, said inner magnet means radius is greater than said first bearing radius.

17. The drive of claim 16 wherein said annular rigid disk is disposed over a third radius range with respect to said primary axis, said third radius range being the range from an inner disk radius to an outer disk radius, wherein said inner disk radius is greater than said outer magnet radius.

18. The drive of claim 5 wherein said annular rigid disk is adhered to said outer hub.

19. The drive of claim 5 wherein a first surface of said annular rigid disk that extends substantially perpendicular to said primary axis is operatively connected to said outer hub, and a second surface of said annular rigid disk that is substantially parallel to said first surface does not directly contact said outer hub.

20. A magnetic recording apparatus comprising:

a base;

a cover secured to said base, to create a space therebetween;

an inner hub capable of rotating about a primary axis;

an outer hub, operatively coupled to said inner hub to rotate therewith, said inner and outer hubs being disposed within said space;

an annular rigid disk, operatively attached to said outer hub, for storing data;

a bearing assembly facilitating rotational movement of said inner hub, said outer hub, and said disk about said primary axis;

magnet means disposed radially between said inner and outer hubs;

a stator including a plurality of coils attached to said cover, and when energized, said coils interacting electromagnetically with said magnet to rotate said inner hub, said outer hub and said disk relative said stator, each of said coils being wound about a second axis that is substantially parallel to said primary axis;

means for causing the sum of the axial magnetic forces acting upon said inner hub to be substantially zero;

wherein said magnetic recording apparatus includes one or more of the following:

(a) said bearing assembly, said inner hub and said outer hub are all located at different radiuses from the primary axis of rotation;

(b) said bearing assembly and said magnet means are located at different radiuses from the primary axis of rotation;

(c) said bearing assembly, said magnet means and said disk are located at different radiuses from the primary axis of rotation;

(d) said magnetic means and the annular rigid disk are positioned at different radiuses from the primary axis of rotation;

(e) said magnetic means and said inner hub are positioned at different radiuses from the primary axis of rotation; or (f) said annular rigid magnetic disk is adhered to said outer hub.

21. The apparatus of claim 20 wherein said base and said cover comprise a ferromagnetic material.

22. The apparatus of claim 20 wherein said base and said cover comprise carbon steel.

23. The apparatus of claim 20 wherein said magnet means comprises a plurality of magnetic segments.

24. The apparatus of claim 20 wherein said magnet means is annular.

25. The apparatus of claim 20 wherein said magnet means comprises Neodymium.

26. The apparatus of claim 20 wherein said inner hub and said outer hub both comprise a non-ferromagnetic material.

27. The apparatus of claim 26 wherein said non-ferromagnetic material is thermally matched to said magnet means.

28. The apparatus of claim 20 wherein said inner hub and said outer hub comprise steel.

29. The apparatus of claim 26 wherein said magnet means is axially aligned with said stator.

30. The apparatus of claim 20 wherein said means for causing the sum of the axial magnetic forces acting upon said inner hub to be substantially zero comprises:

a first air gap formed between said magnet means and said coils; and a second air gap formed between said magnet means and said base.

31. A rigid disk drive comprising:

a support structure including a first support plate, and a second support plate spaced from and opposite said first support plate;

a stator, coupled to said first support plate, including at least first and second coils wound around first and second parallel coil axes, respectively, said stator spaced from said second support plate to define at least a first cylindrical space between said stator and said second support plate, said first cylindrical space having a first axis parallel to said first and second coil axes and a first radius, said cylindrical space axially spaced from said stator by a first air gap and axially spaced from said second support plate by at least a second air gap;

an inner hub, mounted with respect to said support structure at least partially within said first cylindrical space, to rotate about said first axis and having a hub radius;

a magnet assembly extending radially outward from said inner hub, said magnet assembly coupled to and supported by said inner hub to rotate therewith and positioned entirely within said first cylindrical space;

an outer hub extending radially outward from said magnet assembly such that said magnet assembly is positioned radially between said inner hub and said outer hub, said outer hub coupled to and supported by said magnet assembly to rotate therewith and positioned at least partially within said first cylindrical space;

a rigid disk coupled to said outer hub, and having a radius, with respect to said first axis, less than or equal to said first radius; and wherein said stator is capable of interacting electromagnetically with said magnet assembly to rotate said magnet assembly about said first axis, wherein said magnet assembly causes said outer hub to rotate, in turn causing said rigid disk to rotate.

32. A rigid disk drive, as claimed in claim 31, wherein said inner hub has a first axial thickness and wherein said magnet assembly has an axial thickness substantially equal to or greater than said first axial thickness.

\* \* \* \* \*